United States Patent [19]
Balz et al.

[11] Patent Number: 5,441,836
[45] Date of Patent: Aug. 15, 1995

[54] LASER ABLATION MASK REPAIR METHOD

[75] Inventors: James G. Balz, Maybrook; John R. Lankard, Sr., Mahopac; Mark J. LaPlante, Walden, all of N.Y.

[73] Assignee: International Business Machines Corporation, Armonk, N.Y.

[21] Appl. No.: 220,776

[22] Filed: Mar. 30, 1994

[51] Int. Cl.[6] ............................. G03F 9/00
[52] U.S. Cl. ......................... 430/5; 430/297; 430/945; 216/12; 216/26; 216/65; 216/66; 264/1.37; 65/28
[58] Field of Search ............ 430/5, 945, 297; 427/53.1; 156/643

[56] References Cited

U.S. PATENT DOCUMENTS

| | | | |
|---|---|---|---|
| 4,340,654 | 7/1982 | Campi | 430/5 |
| 4,414,059 | 11/1983 | Blum et al. | 156/659.1 |
| 4,463,073 | 7/1984 | Miyauchi et al. | 430/5 |
| 4,508,749 | 4/1985 | Brannon et al. | 427/43.1 |
| 4,851,097 | 7/1989 | Hattori et al. | 204/192.33 |
| 4,923,772 | 5/1990 | Kirch et al. | 430/5 |
| 5,085,957 | 2/1992 | Hosono | 430/5 |

FOREIGN PATENT DOCUMENTS 3-20733  1/1991  Japan.

*Primary Examiner*—S. Rosasco
*Attorney, Agent, or Firm*—Charles W. Peterson, Jr.

[57] ABSTRACT

A laser ablation mask repair method. Defects (holes) are located in a dielectric mask. The surface of the mask above the defect is melted with a $CO_2$ laser to form a depression in the surface. The depression forms a lens which diffuses ablation laser energy instead of transmitting it. Thus, the ablation laser is prevented from ablating a polymer ablation layer, because the holes are blocked and, the mask is repaired. The method may also be used to make Engineering Changes (EC) laser ablation masks.

13 Claims, 2 Drawing Sheets

LASER ABLATION MASK REPAIR METHOD

RELATED INVENTION

The present invention is related to U.S. patent application Ser No. 08/220,776 entitled "LASER ABLATION MASK AND METHOD OF FABRICATION" filed concurrently with this application, assigned to the assignee of the present invention and incorporated herein by reference.

FIELD OF THE INVENTION

The present invention is related to non-contact masks of the type used for projection etching and, more particularly, to non-contact masks of the type used for laser ablation patterning.

BACKGROUND OF THE INVENTION

Patterning of areas in a polymer or resist material using laser ablation is known. The organic layer is, typically, an insulation layer between two wiring planes. Via holes are opened through the organic layer for connecting wires on one level to wires on the other level. U.S. Pat. No. 4,508,749 entitled "Polyimide Films With Ultraviolet Light" to Bannon, et al, assigned to the assignee of the present invention and incorporated herein by reference, teaches a technique for forming patterns in a polymer using laser ablation. Essentially, laser energy, striking the polymer, imparts energy that breaks polymer bonds. The polymer volume expands locally in the area where the bonds are broken. This localized swelling forcibly expels the fragmented polymer from the layer. A mask defines the polymer area to be irradiated.

Laser ablation requires different masks than those used for optical patterning. For non ablation photolithographic (optical) techniques, an opaque pattern is formed on a transparent substrate. Typically, the optical mask is used to form a pattern in photoresist. The photoresist pattern is used to form a pattern in an underlying layer, such as for a wiring plane or an integrated circuit chip layer. However, lasers are seldom employed to expose the photoresist and, when lasers are used, the laser energy is a fraction of that required for laser ablation. However, the material used to form the opaque pattern, e.g., chromium, absorbs laser energy. So, when these optical masks were used for laser ablation, the opaque areas of the optical mask were damaged or destroyed when the organic layer was ablated. Consequently, instead of forming the pattern in the organic layer, the mask is destroyed.

So, for prior art laser ablation masks, the opaque pattern is formed from other materials such as dielectric. U.S. Pat. No. 4,923,772 to Kirch, et al, entitled "High Energy Laser Mask and Method of Making Same" assigned to the assignee of the present invention, and incorporated herein by reference, teaches making a laser ablation mask pattern from multiple dielectric layers. The multiple dielectric layers have alternating high and low indices of refraction that, when overlayed, result in opaque mask areas that exhibit maximum reflectivity of laser energy. As taught by Kirch, et al, making these dielectric masks is a complicated, multistep process. For this reason, dielectric laser ablation masks are expensive.

During mask fabrication, dielectric layer defects may occur that cause mask defects. Also, defects can be inadvertently designed into the mask, by accidentally adding or omitting shapes or by erroneously opening an area, e.g. an extra unwanted via. Defects in a laser ablation mask can be either blocked areas or, areas left open (holes). Since individual dielectric layers do not block the ablation laser, blocked dielectric areas are rare, requiring a repeated defect on several dielectric layers, i.e., enough layers to make an area near opaque. Holes, on the other hand, occur when enough laser energy striking a defective area goes through the mask and ablates the polymer layer, i.e., printing the defect into the polymer layer. These hole defects aren't identified until after the mask is complete. However, once the mask is complete, mask defects, buried in the dielectric layers, cannot be repaired.

Repairing blocked area defects is simpler than repairing holes. Blocked areas may be corrected in the polymer after the pattern is printed, rather than on the mask. Since the defect blocks laser ablation of the polymer, the pattern defect may be corrected by directly ablating the polymer to remove the defect without using a mask.

Unfortunately, omitted shapes, extra vias, or holes may not be repaired so easily. Mask holes, when large enough, print as unwanted holes in the polymer layer, i.e., the laser ablates the polymer at the hole. Omitted shapes, extra vias, or holes in photomasks may be repaired by covering (blocking) the hole. For examples of photomask repair, see U.S. Pat. No. 4,340,654 to Campi wherein an opaque coating material is fused to the defective photomask by an intense source of radiant energy (such as a laser) and see, U.S. Pat. No. 4,463,073 to Miyauchi et al, wherein a metal-organic film on the defective mask is irradiated, rendering the film opaque at the defect. However, because the materials used for these opaque repairs are just as likely to ablate as is the polymer, these repair methods are unusable for permanently repairing laser ablation dielectric masks. Furthermore, holes cannot be refilled in the polymer pattern because, once removed, the polymer cannot be replaced reliably. Consequently, modifying a laser ablation mask to cover an unwanted open, whether to repair a defect or to affect an Engineering Change (EC), meant making a new mask.

Another approach to optical mask repair is used for phase shift masks. Unlike typical optical photomasks, phase shift masks rely on the phase of light striking photoresist from adjacent mask openings. Light passing through a phase shift mask from adjacent openings will either reinforce (in phase) or cancel (out of phase) to form very fine integrated circuit shapes. U.S. Pat. No. 5,085,957, "Method of Repairing a Mask" to Hosono, teaches a repair method for a phase shift mask. In Hosono, an ion beam is directed at a defect to trench the mask surface ($\lambda$) sufficiently so that the light passing through the defect is out of phase (shifted) with adjacent pattern light. Thus, the phase shifted light from the defect is cancelled by the adjacent light and the defect is not printed.

However, phase shifting is not applicable to laser ablation for a number of reasons. First, the transmission openings which are narrow enough to pass x-rays, would appear opaque to the ablation laser. Second, a laser is not diffuse enough that, regardless of phase, energy from one transmissive area would interfere with another adjacent transmissive area. Thus, shifting the laser's phase would not affect the defect. So, for the reasons photomasks make poor laser ablation masks, prior art methods of photomask repair are not practical to repair holes in a laser ablation dielectric mask.

This defect problem is compounded by the fact that larger images are being ablated to improve manufacturing efficiency. A larger image requires a larger mask. Mask defect rates are a measure of the number of mask defects per unit area. Typical laser ablation mask defect rates are $0.000083/mm^2$. For a 15 mm by 15 mm mask, approximately 1 mask in 100 will have a defect. When only 1 in 100 masks is bad, remaking a defective mask is a minor annoyance. However, for a large laser ablation mask, 150 mm $\times$ 150 mm, the probability of a defect rises to 100%. Thus it has become impossible to make defect free large laser ablation masks. Therefore, defective laser ablation masks must be repairable.

OBJECTS OF THE INVENTION

It is an object of the invention to reduce laser ablation mask cost.

It is another object of the invention to increase laser ablation mask manufacture yield.

It is yet another object of the invention to simplify laser ablation mask repair.

It is yet another object of the invention to reduce laser ablation mask modification time.

SUMMARY OF THE INVENTION

The present invention is a laser ablation mask engineering change (EC) or repair method comprised of forming a lens in one surface of a mask, the lens being formed in a mask defect area. The lens is formed by melting the surface area with a $CO_2$ laser or ion beam.

DETAILED DESCRIPTION OF THE DRAWINGS

BRIEF DESCRIPTION OF THE PREFERRED EMBODIMENTS

Figure 1:
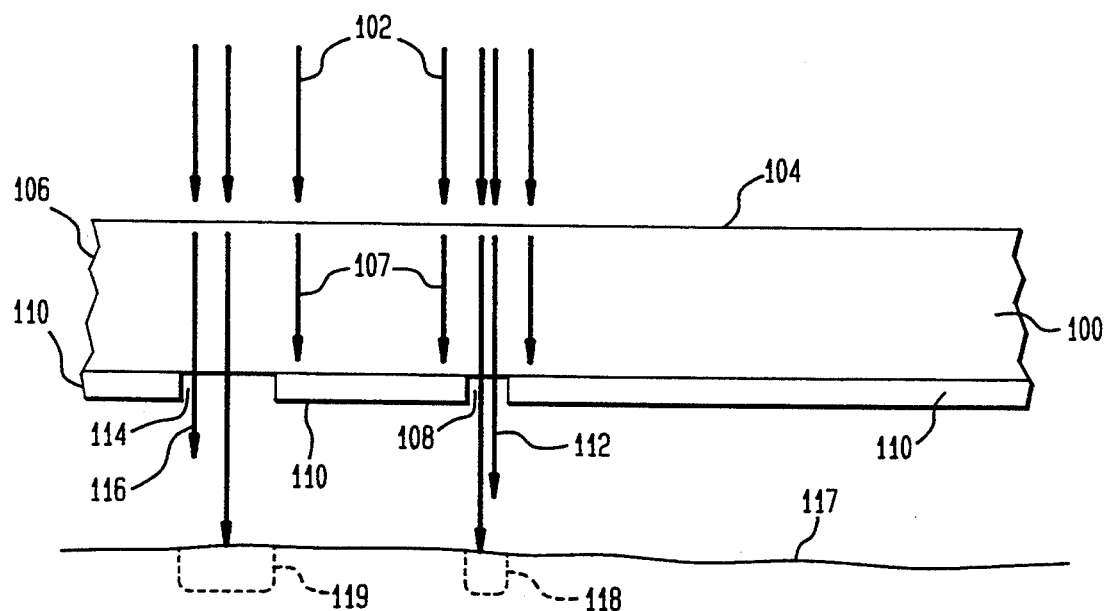
FIG. 1 represents a cross section of a defective dielectric laser ablation mask.

FIG. 1 represents a cross section of a defective laser ablation dielectric mask 100. Laser energy 102 strikes one surface 104 of a substrate 106. The substrate may be quartz or, alternatively, calcium fluoride. The substrate transmits light within the wavelength ($\lambda$) range of the ablation laser, and so, appears transparent to the ablation laser. A quartz substrate is transparent to wavelengths in the ultraviolet (uv) range, $0.16 \ \mu m \leq \lambda \leq 4.0 \ \mu m$. Thus, the light 107 from the uv ablation laser 102 passes through the quartz substrate 106. Ablation laser energy exits both hole defect 108 in dielectric pattern layers 110 as defect laser energy 112 and from pattern area 114 as pattern laser energy 116. Both defect energy 112 and pattern energy 116 strike polymer layer 117. Defect energy 112 ablates (prints) the hole 118, unintentionally, when the pattern 119 is printed by pattern energy 116.

Figure 2:
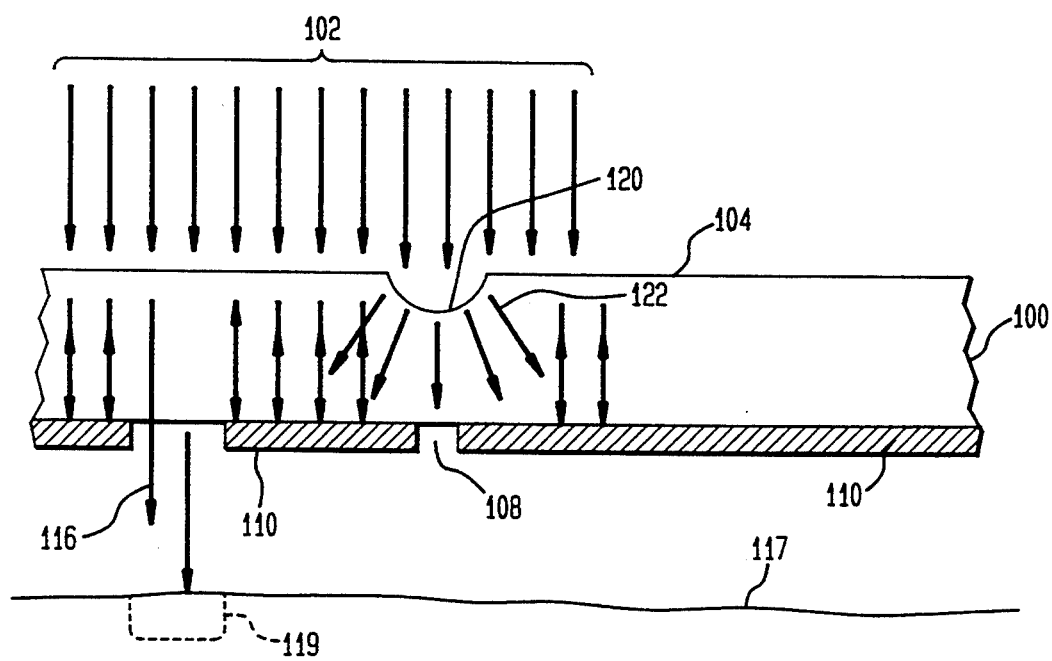
FIG. 2 represents the mask of FIG. 1 repaired according to the preferred embodiment of the present invention.

FIG. 2 represents the mask of FIG. 1 repaired according to the repair method of the preferred embodiment of the present invention. A lens area 120 is formed in the quartz substrate surface 104 above the defect 108. The lens area 120 refracts the laser energy 102 and diffuses it 122 as it enters the substrate 106 directly above the defect 108. Because the transmitted energy 122 is diffused by the lens area, insufficient laser energy exits the hole defect 108 to ablate the polymer 118.

Preferably, lens area 120 is formed by a laser, although any appropriate means may be substituted. A laser provides the ability to precisely locate the lens area and to minimize lens size. Alternatively, although it would take prohibitively longer, an ion beam could be used to melt the lens area 120 into the surface with roughly the same precision. The substrate 106 must be (strongly absorbing) opaque to the repair laser, so that the substrate surface 104 will absorb enough energy to melt and form lens area 120. Quartz will absorb most of the laser energy from a carbon dioxide ($CO_2$) laser which has a wavelength $\lambda$) beyond the transmission range of quartz, i.e., for $CO_2 \lambda = 10.6 \ \mu m$.

Figure 3:
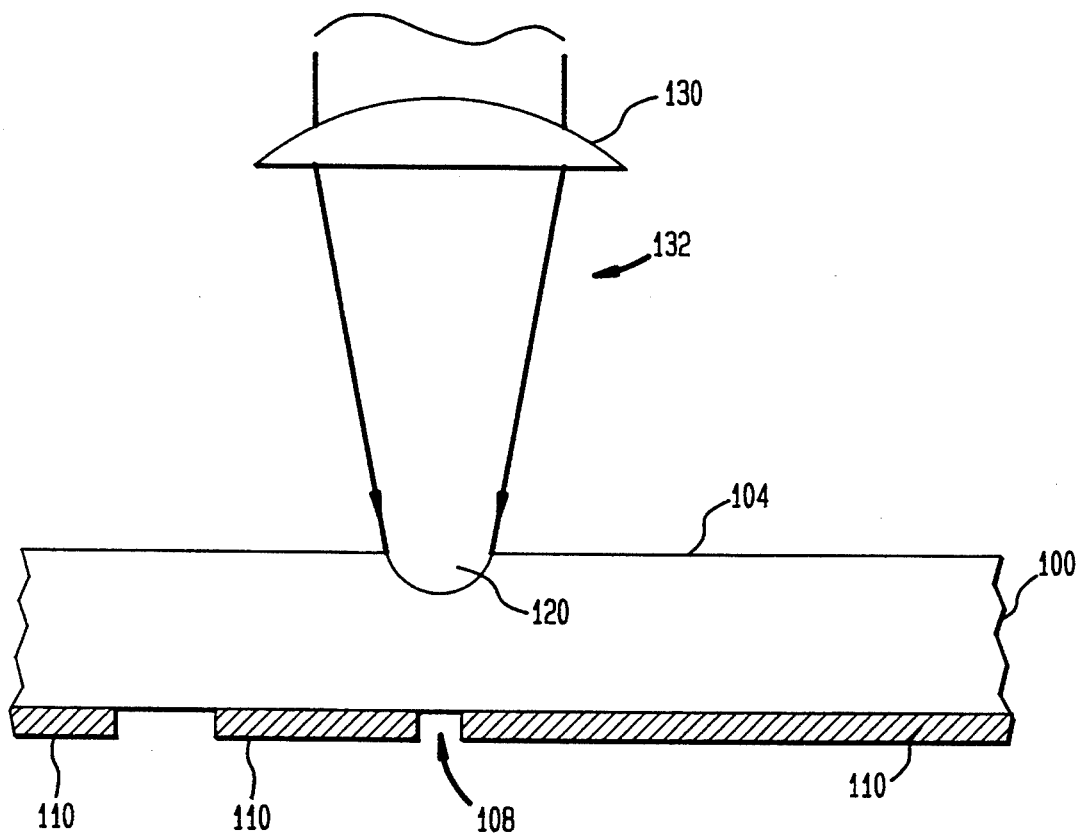
FIG. 3 represents the method of repair of the defective mask of FIG. 1 according to the preferred embodiment of the present invention.

FIG. 3 represents the preferred repair arrangement wherein a lens 130 focusses a $CO_2$ laser beam 132 onto the defective mask 100. Although the preferred focussing arrangement is a plano-convex lens, any focussing arrangement may be substituted. The quartz surface 104 is melted wherever laser energy of proper intensity and pulse width strikes. The $CO_2$ laser 132 melts the substrate surface 104 above the defect 108 to form concave lens area 120. The concave lens area 120 diffuses any light entering it. So, the shorter wavelength ablation laser energy entering lens area 120 is diffused into the quartz substrate 106 instead of passing through the defect 108. Consequently, very little ablation laser energy reaches the polymer layer 118 through the mask defect 108. Therefore, a defect is not formed in the polymer layer and the mask 100 has been repaired.

The present invention may also be used to repair or change EC laser ablation masks. Whether the source of the defect is design, process or resulting from changed wiring, the open area is closed, repairing an otherwise useless mask.

While the present invention is described in terms of preferred embodiments, numerous variations and alterations will occur to a person skilled in the art, without departing from the spirit or scope of the invention. The appended claims are intended to encompass those variations and alternations which fall within the spirit and scope of the invention.

We claim:

1. A dielectric mask repair method comprised of forming a lens in a surface of a mask, said lens being formed opposite a mask defect area, wherein said defect is in a dielectric mask pattern at a surface of said mask opposite the surface where said lens is formed.

2. The dielectric mask repair method of claim 1 wherein said lens is formed by directing a focussed energy beam at said mask surface.

3. The dielectric mask repair method of claim 2 wherein said focussed energy beam is a focussed laser beam.

4. The dielectric mask repair method of claim 2 wherein said focussed energy beam is a focussed ion beam.

5. The dielectric mask repair method of claim 3 wherein said repair laser is a pulsed $CO_2$ laser.

6. A dielectric mask repair method comprised of focussing an energy beam at a surface of said dielectric mask opposite an identified defect area in a dielectric mask pattern, said focussed energy beam creating a lens in said surface.

7. The dielectric mask repair method of claim 6 wherein said energy beam is an ion beam.

8. The mask repair method of claim 6 wherein the energy beam is a pulsed laser beam.

9. The mask repair method of claim 8 wherein the laser is a $CO_2$ laser.

10. A Laser Ablation Mask comprising:
   a substrate being substantially transparent to light having a predetermined wavelength λ;
   a mask pattern on one substrate surface; and,
   at least one lens area on an opposite surface of said substrate, each said at least one lens area being opposite an open mask area.

11. The laser ablation mask of claim 10 wherein said mask pattern comprises a plurality of dielectric layers.

12. The laser ablation mask of claim 10 wherein said substrate is a layer of quartz.

13. The laser ablation mask of claim 10 wherein $0.28 \mu m \leq \lambda \leq 2.0 \mu m$.

* * * * *